United States Patent
Kaneko et al.

(10) Patent No.: US 7,642,745 B2
(45) Date of Patent: Jan. 5, 2010

(54) CHARGING APPARATUS

(75) Inventors: Satoshi Kaneko, Wako (JP); Koji Okazaki, Wako (JP); Norio Neki, Wako (JP); Hiroyuki Makino, Wako (JP); Takashi Nakayama, Wako (JP); Masaaki Muromachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 12/059,237

(22) Filed: Mar. 31, 2008

(65) Prior Publication Data

US 2008/0238365 A1 Oct. 2, 2008

(30) Foreign Application Priority Data

Apr. 2, 2007 (JP) .............................. 2007-095979

(51) Int. Cl.
*H02J 7/00* (2006.01)

(52) U.S. Cl. ....................................................... 320/107

(58) Field of Classification Search ......... 320/107–109, 320/112, 114; 455/462; 439/136
See application file for complete search history.

(56) References Cited

U.S. PATENT DOCUMENTS 6,591,923 B2 * 7/2003 Inoue et al. ................... 180/8.1
7,227,334 B2 * 6/2007 Yang et al. ................... 320/107
7,525,281 B2 * 4/2009 Koyanagi et al. ........... 320/107

FOREIGN PATENT DOCUMENTS

| EP | 1 633 029 | 3/2006 |
| EP | 1 819 026 | 8/2007 |
| JP | 06-031668 | 2/1994 |
| JP | 2005-149808 | 6/2005 |
| JP | 2006-231448 | 9/2006 |

* cited by examiner

*Primary Examiner*—Edward Tso
*Assistant Examiner*—Ramy Ramadan
(74) *Attorney, Agent, or Firm*—Rankin, Hill & Clark LLP (57) ABSTRACT

An apparatus capable of charging a battery mounted on a robot while allowing the robot to remain stably still in the state of standing on its legs is provided. Driving a first connector backward while it is connected with a second connector would cause a body of the robot to tilt as if being pulled by the first connector. However, it is possible to prevent the posture of the robot from becoming unstable by utilizing the fact that the connected state of first signal terminals and second signal terminals is maintained in that state. The backward driving of the first connector is restricted when a charge control unit is capable of communicating with a control system via the first signal terminals and the second signal terminals. This prevents the undesirable event that the posture of the robot becomes unstable due to the first connector being driven backward unconditionally.

11 Claims, 9 Drawing Sheets

CHARGING APPARATUS

BACKGROUND OF THE INVENTION

1. Field of the Invention

The present invention relates to an apparatus for charging a battery mounted on a robot.

2. Description of the Related Art

There has been proposed an apparatus for charging a battery mounted on a robot, the robot having a plurality of legs extended from its body and capable of being still or moving while standing on the legs as the operations of the legs are controlled by a control system (see Japanese Patent Application Laid-Open No. 06-031668). According to this charging apparatus, the battery is charged, in the state where a first connector on the charging apparatus side is connected to a second connector on the robot side, with a current output from a charging power source and supplied to the battery through the two connectors connected to each other.

However, in the case where the first connector is moved while the robot is standing still so as to switch the first and second connectors from the connected state to the disconnected state, some force may be applied to the robot causing its posture to become unstable.

SUMMARY OF THE INVENTION

In view of the foregoing, an object of the present invention is to provide an apparatus capable of charging a battery mounted on a robot while allowing the robot to remain stably still in the state of standing on its legs.

A charging apparatus of a first invention is an apparatus for charging a battery mounted on a robot, the robot having a plurality of legs extended from its body and capable of being still or moving in a state of standing on the legs, with operations of the legs controlled by a control system, the apparatus comprising a charging power source, a first connector, a connector driving mechanism which drives the first connector, and a charge control unit which controls an operation of the connector driving mechanism, the first connector having a first charging terminal and a first signal terminal, wherein the body has a second connector connected to the first connector, the second connector having a second charging terminal and a second signal terminal, and the first and second charging terminals are connected and the first and second signal terminals are connected in a connected state of the first and second connectors, whereas the first and second charging terminals are disconnected and the first and second signal terminals are disconnected in a disconnected state of the first and second connectors, and wherein the charge control unit causes the connector driving mechanism to drive the first connector forward to attain the connected state of the first and second connectors on the condition that the charge control unit confirms that the robot is standing still on the legs in a predetermined position and at a predetermined posture with the first and second connectors in the disconnected state, the charge control unit allows the battery to be charged with a current output from the charging power source via the first and second charging terminals on the condition that the charge control unit confirms through communication with the control system via the first and second signal terminals that the first and second connectors are in the connected state, and the charge control unit causes the connector driving mechanism to drive the first connector backward to allow the first and second connectors in the connected state to attain the disconnected state, and the charge control unit restricts an amount by which the first connector is driven backward on the condition that the charge control unit is capable of communicating with the control system via the first and second signal terminals during the time when the first connector is driven backward.

According to the charging apparatus of the first invention, the first connector is driven forward on the condition that it is confirmed that the position and posture of the robot correspond respectively to a predetermined position and a predetermined posture. Therefore, if the condition is satisfied that the robot is standing still in the predetermined position and at the predetermined posture, the first connector is driven forward to ensure connection between the first and second connectors, without forcing any further operation to the robot for posture change or the like.

Further, the current output from the charging power source is supplied to the battery via the first and second charging terminals on the condition that the connected state is confirmed as the charge control unit communicates with the control system of the robot via the first and second signal terminals. This prevents the abnormal event that the charge control unit misunderstands that the battery is being charged despite the disconnected state of the first and second connectors.

Furthermore, the first connector is driven backward at the time of completion of battery charge or the like, which ensures disconnection between the first and second connectors. Then, the robot is capable of moving away from the charging apparatus by the operations of the legs.

If the first connector is driven backward while the first and second connectors are still connected to each other, the body of the robot will be tilted as if being pulled by the first connector. However, the undesirable event that the posture of the robot becomes unstable can be prevented by utilizing the fact that the connected state of the first and second signal terminals is maintained as the first and second connectors remain connected to each other. In other words, the backward movement of the first connector is restricted in the state where the charge control unit is capable of communicating with the control system via the first and second signal terminals. This prevents the robot from becoming unstable in posture due to the first connector being driven backward unconditionally.

A charging apparatus according to a second invention is characterized in that, in the charging apparatus of the first invention, at the time when the charge control unit causes the connector driving mechanism to drive the first connector backward, in the case where the charge control unit is capable of receiving via the first and second signal terminals an angle signal output from a tilt sensor provided in the robot and in the case where a tilt angle of the body with respect to a vertical direction represented by the angle signal is not less than a first predetermined angle, the charge control unit causes the connector driving mechanism to stop driving the first connector backward.

According to the charging apparatus of the second invention, in the case where the charge control unit receives an angle signal output from the tilt sensor of the robot while the first connector is being driven backward, the tilt angle of the body represented by the angle signal can be recognized. That the angle signal can be received means that the connected state of the first and second connectors is maintained, and hence, it is highly likely that the posture of the robot will become unstable if the first connector is further driven backward. Thus, the backward movement of the first connector is stopped in response to the determination result that the tilt angle is not smaller than the first predetermined angle. This prevents the robot, which is standing still, from becoming unstable in posture when the first connector is disconnected from the second connector.

A charging apparatus according to a third invention is characterized in that, in the charging apparatus of the second invention, the charge control unit causes the connector driving mechanism to stop driving the first connector backward and to drive the first connector forward, and in the case where the tilt angle of the body with respect to the vertical direction represented by the angle signal becomes not more than a second predetermined angle that is smaller than the first predetermined angle, the charge control unit causes the connector driving mechanism to stop driving the first connector forward and to drive the first connector backward again.

According to the charging apparatus of the third invention, the posture of the robot is made closer to the original posture upon initiation of the backward movement of the first connector before it becomes stable, and then the first connector is driven backward again. That is, even if disconnection of the first connector from the second connector failed, it is tried again to disconnect the first connector from the second connector while maintaining the stable posture of the robot.

A charging apparatus according to a fourth invention is characterized in that, in the charging apparatus of the third invention, the charge control unit causes the connector driving mechanism to stop driving the first connector further backward in the case where the number of times the connected state of the first and second connectors is tried to be changed to the disconnected state or an accumulated time exceeds a threshold value.

According to the charging apparatus of the fourth invention, in the abnormal situation where it is not possible to disconnect the first connector from the second connector after repeatedly driving the first connector backward or the like, it is prohibited to drive the first connector further backward. This ensures motion economy of the charging apparatus.

A charging apparatus according to a fifth invention is characterized in that, in the charging apparatus of the first invention, the charge control unit causes the connector driving mechanism to drive the first connector backward and to stop the first connector in a first predetermined position, determines whether communication with the control system is possible, and, on the condition that the communication is possible, prohibits the connector driving mechanism from driving the first connector further backward.

According to the charging apparatus of the fifth invention, in the state where the first connector is driven backward and then stopped in a first predetermined position, the charge control unit determines whether communication with the control system of the robot is possible. That the communication is possible in this state means that the connected state of the first and second connectors is maintained, and hence, it is highly likely that the posture of the robot will become unstable if the first connector is driven further backward. Thus, it is prohibited to drive the first connector further backward in response to the determination result that the communication is possible. This prevents the robot, which is standing still, from becoming unstable in posture when the first connector is disconnected from the second connector.

A charging apparatus according to a sixth invention is characterized in that, in the charging apparatus of the fifth invention, after prohibiting the connector driving mechanism from driving the first connector further backward, the charge control unit causes the connector driving mechanism to drive the first connector forward and to stop the first connector in a second predetermined position, and causes the connector driving mechanism to drive the first connector backward again.

According to the charging apparatus of the sixth invention, the posture of the robot is made closer to the original posture at the time of initiation of the backward movement of the first connector to prevent the robot from suffering unstable posture, and then the first connector is driven backward again. That is, even if disconnection of the first connector from the second connector failed, it is tried again to disconnect the first connector from the second connector while securing the stable posture of the robot.

A charging apparatus according to a seventh invention is characterized in that, in the charging apparatus of the sixth invention, the charge control unit causes the connector driving mechanism to stop driving the first connector further backward in the case where the number of times the connected state of the first and second connectors is tried to be changed to the disconnected state or an accumulated time exceeds a threshold value.

According to the charging apparatus of the seventh invention, in the abnormal situation where it is not possible to disconnect the first connector from the second connector after repeatedly driving the first connector backward or the like, further backward driving of the first connector is stopped. This ensures motion economy of the charging apparatus.

A charging apparatus according to an eighth invention is characterized in that, in the charging apparatus of the first invention, with an increase of an amount by which the first connector is driven backward by the connector driving mechanism, the charge control unit causes the connector driving mechanism to stepwise or steplessly decrease a speed of driving the first connector backward.

According to the charging apparatus of the eighth invention, as the probability that the posture of the robot, which is standing still, becomes unstable increases, the first connector is driven backward with a gradually decreased speed. This prevents the robot, which is standing still, from becoming unstable in posture due to the event that, at the time when the first connector is disconnected from the second connector while the robot's body is tilted with respect to the vertical direction, the robot continues to move by inertia caused by the force applied to the body from the first connector to that time.

A charging apparatus according to a ninth invention is characterized in that, in the charging apparatus of the first invention, the first connector has a first engagement portion and the second connector has a second engagement portion, and the first and second engagement portions are engaged in the connected state of the first and second connectors, whereas the first and second engagement portions are disengaged in the disconnected state of the first and second connectors.

According to the charging apparatus of the ninth invention, engagement between the first and second engagement portions ensures the connected state of the first and second connectors. On the other hand, during the time when the first connector is driven backward, if failure in disengagement of the first and second engagement portions causes failure in disconnection of the first and second connectors, the backward driving of the first connector is stopped as described above. This prevents the robot from becoming unstable in posture.

A charging apparatus according to a tenth invention is characterized in that, in the charging apparatus of the ninth inventions, the first engagement portion corresponds to a pin protruding in a radial direction from a sidewall of a rod provided in the first connector, the rod having a tip end located closer to the second connector than the first charging terminal and the first signal terminal in the state where the robot is in the predetermined position and at the predetermined posture, the rod being rotated about an axis by a rod rotating mechanism, the second engagement portion corresponds to a terminal end of a guide formed on a sidewall of a tube to and from which the rod is inserted and extracted in an axial direction, the guide being adapted to guide the pin in a circumferential direction of the tube as the rod is moved in the axial direction while being rotated about the axis to be inserted to or extracted from the tube, and the charge control unit causes the rod rotating mechanism to rotate the rod about the axis, and causes the connector driving mechanism to drive the first connector forward or backward such that the rod moves in the axial direction.

According to the charging apparatus of the tenth invention, the first connector is driven forward while the rod is being rotated about the axis, in the clockwise direction for example. This allows the rod to be inserted into the tube gradually, with the pin protruding from the sidewall of the rod being guided by the guide formed on the sidewall of the tube toward the terminal end of the guide. Further, the first charging terminal and the first signal terminal are connected to the second charging terminal and the second signal terminal, respectively. Even if there occurs more or less misalignment between the first and second connectors, such misalignment is corrected during the process where the rod is inserted into the tube. The engagement of the pin with the terminal end of the guide ensures the connected state of the first and second connectors.

The first connector is driven backward while the rod is rotated about the axis, in the anti-clockwise direction for example. As such, the rod is gradually extracted from the tube, with the pin being guided by the guide toward the leading end of the guide. Further, the first charging terminal and the first signal terminal are disconnected from the second charging terminal and the second signal terminal, respectively. If the first connector is not disconnected from the second connector due to the pin getting stuck in the guide or the like, the backward movement of the first connector is stopped, thereby preventing the robot from suffering unstable posture.

A charging apparatus according to an eleventh invention is characterized in that, in the charging apparatus of the first invention, it comprises a compliance mechanism which holds the first connector in a manner allowing the first connector to follow displacement of the second connector due to displacement of the body in the connected state of the first and second connectors.

According to the charging apparatus of the eleventh invention, in the case where the robot moves while the first and second connectors are connected to each other and thus causes displacement of the body, the first connector is allowed to follow the displacement of the second connector accompanying the displacement of the body. This prevents the undesirable event that the movement of the robot exerts excessive force on the first and second connectors that would cause damage to the connectors.

DESCRIPTION OF THE PREFERRED EMBODIMENTS

An embodiment of the charging apparatus according to the present invention will now be described with reference to the drawings. Firstly, the configurations of the charging apparatus and the robot mounted with the battery to be charged by the charging apparatus will be described.

Figure 1:
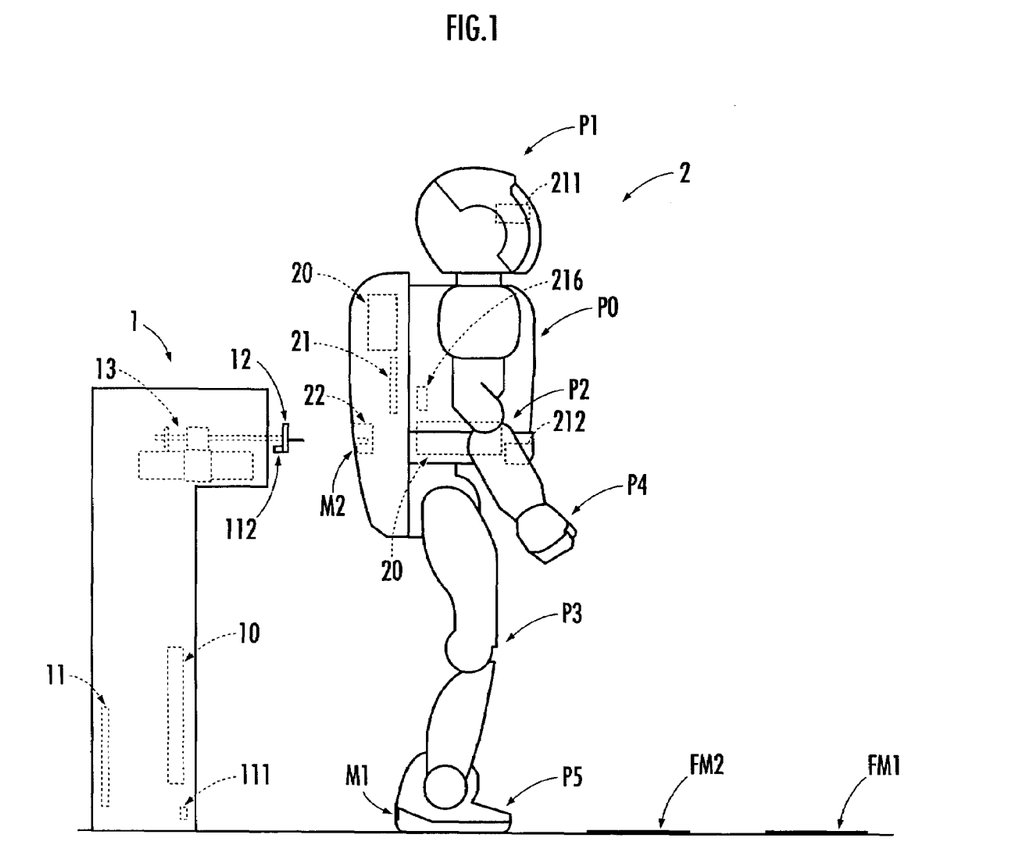
FIG. 1 illustrates the configurations of a charging apparatus and a robot.

The charging apparatus 1 shown in FIG. 1 is for charging a battery 20 mounted on a robot 2 by a current output from a charging power source 10.

The charging apparatus 1 includes: the charging power source 10; a charge control unit 11 which primarily controls an operation of the charging apparatus 1; a first connector 12; and a connector driving mechanism 13. The charging apparatus 1 further includes: a first sensor 111 which uses infrared light or other light to detect a first mark $M_1$ provided at a heel of the robot 2; and a second sensor 112 which uses infrared light or other light to detect a second mark $M_2$ provided at the back of a body P0 of the robot 2.

Figure 2:
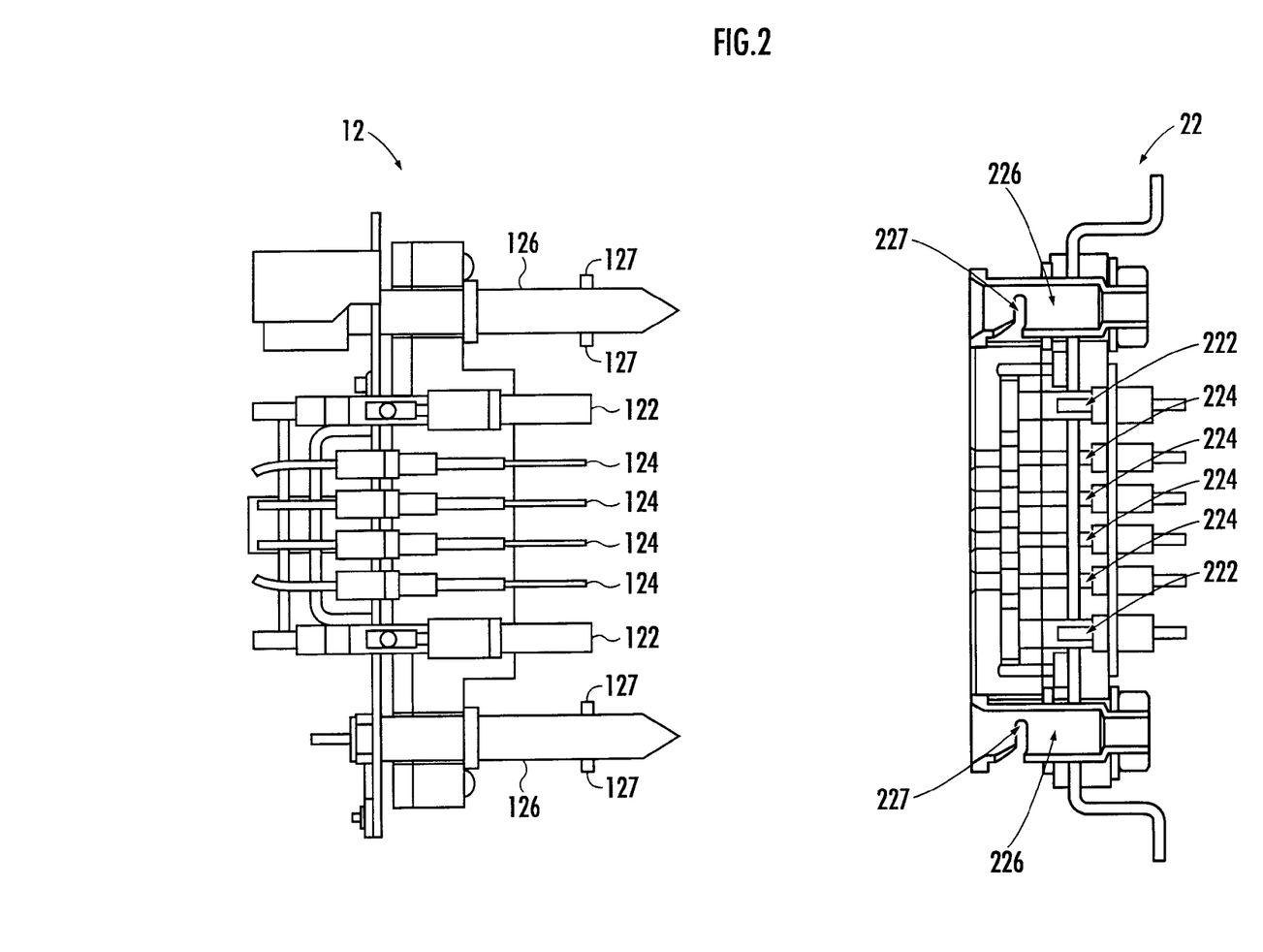
FIG. 2 illustrates the configurations of first and second connectors.
Figure 3:
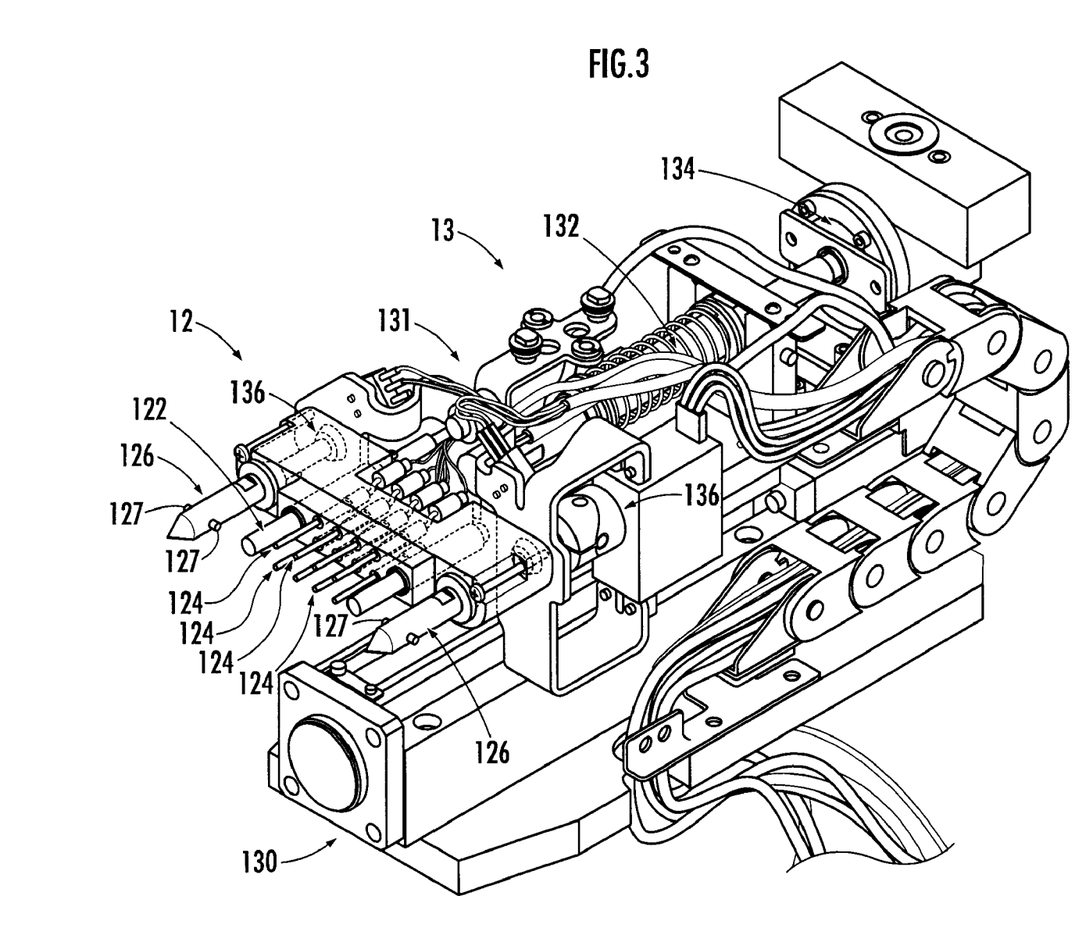
FIG. 3 illustrates the configuration of the charging apparatus of the present invention.

As shown in FIGS. 2 and 3, the first connector 12 is provided with first charging terminals 122, first signal terminals 124, and rods 126, which are arranged side by side to protrude in a horizontal direction. A pair of pins (first engagement portion) 127 is provided on a sidewall of each rod 126, to protrude therefrom. The rods 126 are each attached to the first connector 12 in a manner allowing movement or deflection in its radial direction by virtue of a compliance mechanism.

The connector driving mechanism 13 is of a cylindrical type. As shown in FIG. 3, the connector driving mechanism 13 includes: a base 130; a slider 131 having an end to which the first connector 12 is attached; a cylinder rod 132 which causes the slider 131 to slide back and forth on the base 130; a compliance mechanism 134 which secures the cylinder rod 132 in a manner allowing its radial movement or deflection; and a rod rotating mechanism 136 which rotates the rods 126 about the axis. The position of the first connector 12 is measured based on the driven amount of the slider 131 by the cylinder rod 132.

The robot 2 is a humanoid robot, which is provided with: a head P1 provided on top of the body P0; left and right arms P2 extended from the respective sides of an upper part of the body P0; a hand P4 provided at an end of each of the left and right arms P2; left and right legs P3 extended downward from a lower part of the body P0; and a foot P5 provided at an end of each of the left and right legs P3. The robot 2 includes: a battery 20; a control system 21 which primarily controls an operation of the robot 2; and a second connector 22 provided on the backside of the body P0. The robot 2 includes a head camera 211 mounted on the head P1 and a waist camera 212 provided on the front side of the lower part of the body P0. The robot 2 further includes various sensors including: a tilt sensor 216 which outputs a signal responsive to the tilt angle of the body P0 with respect to its vertical direction, a rotary encoder which outputs a signal responsive to the joint angle of each of the arms P2, legs P3 and the like, and a 6-axis force sensor which outputs a signal responsive to the force acting on the hands P4, feet P5 and the like. The robot 2 further includes actuators provided at the respective joints as the driving sources of the arms P2, hands P4, legs P3, and the like.

Figure 4:
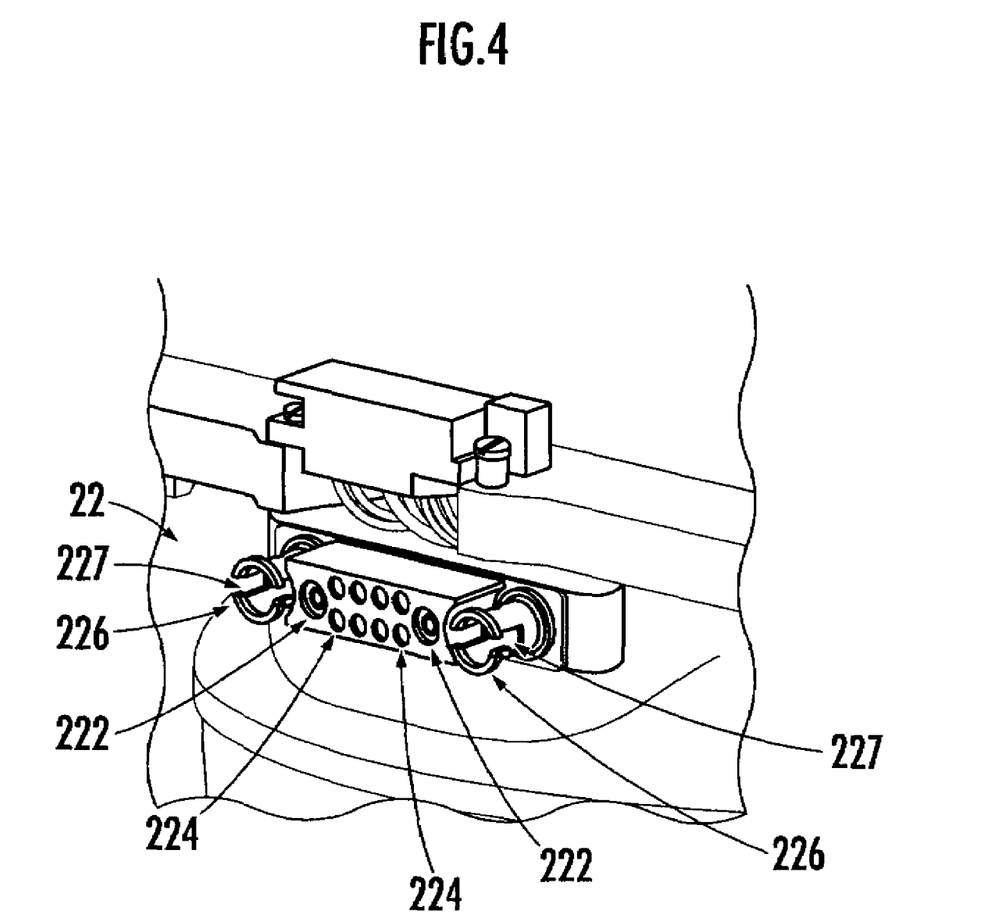
FIG. 4 illustrates the configuration of the second connector.

As shown in FIGS. 2 and 4, the second connector 22 has second charging terminals 222, second signal terminals 224, and tubes 226, which are provided side by side. The sidewall of each tube 226 is partially notched to provide a guide (second engagement portion) 227.

In the connected state of the first connector 12 and the second connector 22, the first charging terminals 122 and the first signal terminals 124 are connected to the second charging terminals 222 and the second signal terminals 224, respectively, the rods 126 are inserted into the tubes 226, and the pins 127 are each engaged with the terminal end of the corresponding guide 227. On the other hand, in the disconnected state of the first connector 12 and the second connector 22, the first charging terminals 122 and the first signal terminals 124 are separated from the second charging terminals 222 and the second signal terminals 224, respectively, the pins 127 are disengaged from the terminal ends of the guides 227, and the rods 126 are pulled out of the tubes 226.

The functions of the charging apparatus 1 having the above configuration will now be described.

Figure 5:
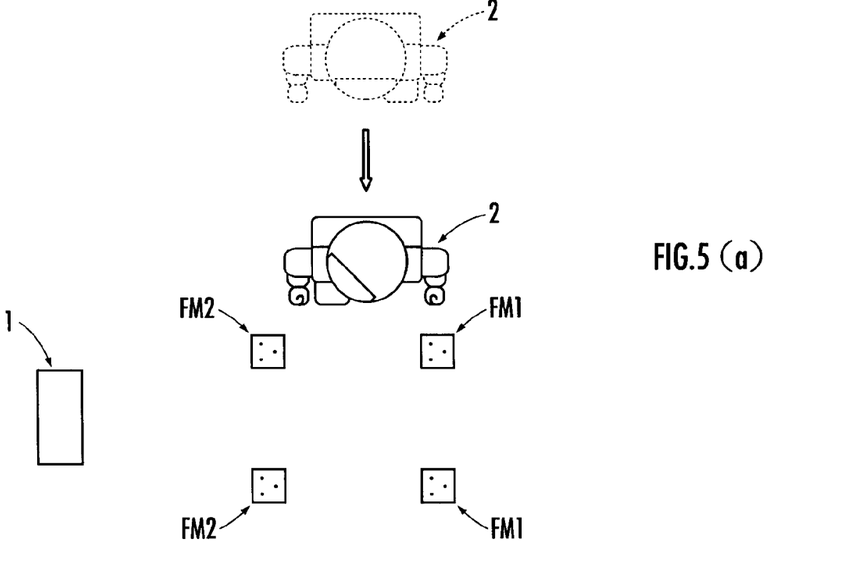
FIG. 5 illustrates how the position and posture are controlled by the robot.

Firstly, the robot 2 carries out control such that its position and posture match a predetermined position and a predetermined posture, respectively. For example, the robot 2 moves to come closer to the charging apparatus 1 as shown in FIG. 5(a), stands with its back facing the charging apparatus 1 as shown in FIG. 5(b), and moves backward and then stands still as shown in FIG. 5(c). The control system 21 of the robot 2 is capable of recognizing the existence of the charging apparatus 1 from an image picked up by the head camera 211, and capable of recognizing the standing position and posture with respect to the charging apparatus 1 based on the positions and postures of floor marks $FM_1$ and $FM_2$ picked up by the waist camera 212.

In the charging apparatus 1, "first control processing" is carried out by the charge control unit 11. Specifically, at the time when the charging apparatus 1 is connected to a commercial power supply for example, the first sensor 111 is switched from OFF to ON (S102 in FIG. 6), and an index "m" representing the number of times the first connector 12 is tried to be connected to the second connector 22 is reset to an initial value "0" (S104 in FIG. 6). It is noted that the first sensor 111 may be maintained at ON continuously. On the condition that the first sensor 111 detects the first mark $M_1$ provided at the heel (backside of the foot P5) of the robot 2 (YES in S106 in FIG. 6), the second sensor 112 is switched from OFF to ON (S108 in FIG. 6). Further, on the condition that the second sensor 112 detects the second mark $M_2$ provided at the back of the body P0 of the robot 2 (YES in S112 in FIG. 6), the connector driving mechanism 13 drives the first connector 12 forward or in the direction approaching the second connector 22 (S114 in FIG. 6).

Figure 6:
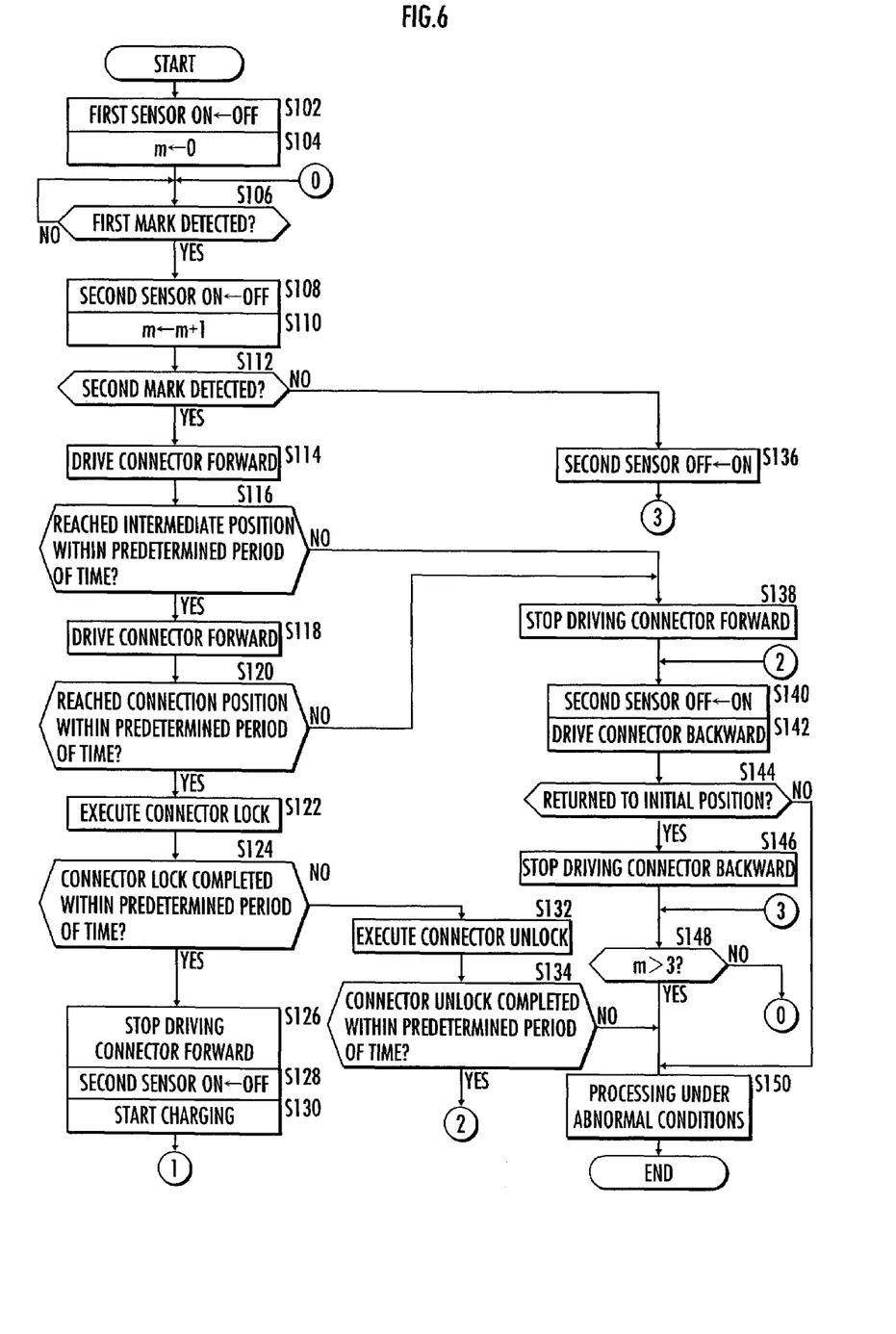
FIG. 6 illustrates first control processing according to the charging apparatus of the present invention.

Thereafter, it is determined whether the first connector 12 has reached an intermediate position within a predetermined period of time (S116 in FIG. 6). If the determination result is positive (YES in S116 in FIG. 6), the first connector 12 is further driven forward (S118 in FIG. 6). It is then determined whether the first connector 12 has reached a connection position within a predetermined period of time (S120 in FIG. 6). At the time when the first connector 12 is in the connection position, the tip end of each rod 126 is inserted to the corresponding tube 226, and the pins 127 are each guided to the leading end of the corresponding guide 227.

If the determination result is positive (YES in S120 in FIG. 6), driving for connector lock is carried out (S122 in FIG. 6). At this time, the rod rotating mechanism 136 rotates each rod 126 about the axis in a prescribed direction. Further, the first connector 12 is driven forward to assist achievement of the connector lock. Consequently, the rods 126 are each gradually inserted into the corresponding tube 226 while the pins 127 protruding from the sidewall of the rod 126 are each guided by the corresponding guide 227 of the tube 226, and each pin 127 reaches and is engaged with the terminal end of the corresponding guide 227, whereby the connector lock is achieved. With achievement of the connector lock, the first connector 12 and the second connector 22 are connected to each other. That is, the first charging terminals 122 and the first signal terminals 124 are connected to the second charging terminals 222 and the second signal terminals 224, respectively.

It is further determined whether the connector lock was completed within a predetermined period of time, based on the rotation angle of the rod 126 by the rod rotating mechanism 136 (S124 in FIG. 6). If the determination result is positive (YES in S124 in FIG. 6), the forward movement of the first connector 12 is stopped (S126 in FIG. 6), and the second sensor 112 is switched from ON to OFF (S128 in FIG. 6). Charging of the battery 20 is then started (S130 in FIG. 6) after the charge control unit 11 confirms the state-of-charge (SOC) of the battery 20 by communicating with the control system 21 via the first signal terminals 124 and the second signal terminals 224. In this manner, the current output from the charging power source 10 is supplied to the robot 2 through the first charging terminals 122 and the second charging terminals 222 for charging of the battery 20.

If the second mark $M_2$ is not detected by the second sensor 112 (NO in S112 in FIG. 6), the second sensor 112 is switched from ON to OFF (S136 in FIG. 6). Then, on the condition that the index "m" is not greater than the threshold value "3" (NO in S148 in FIG. 6), the detection of the first mark $M_1$ by the first sensor 111 (see S106 in FIG. 6) and the subsequent processing are repeated. On the other hand, if the index "m" has exceeded the threshold value "3", execution of the first control processing is prohibited, and the processing under abnormal conditions, such as an output of sound from a speaker (not shown) or the like, is carried out (YES in S148, and S150 in FIG. 6).

If the first connector 12 fails to reach the intermediate position or the connection position within a predetermined period of time (NO in S116 or NO in S120 in FIG. 6), the forward movement of the first connector 12 is stopped (S138 in FIG. 6). The second sensor 112 is switched from ON to OFF (S140 in FIG. 6), and the first connector 12 is driven backward (S142 in FIG. 6). Further, it is determined whether the first connector 12 has returned to an initial position within a predetermined period of time (S144 in FIG. 6). If the determination result is positive (YES in S144 in FIG. 6), the backward movement of the first connector 12 is stopped (S146 in FIG. 6). Further, on the condition that the index "m" is not greater than "3" (NO in S148 in FIG. 6), the detection of the first mark $M_1$ by the first sensor 111 (see S106 in FIG. 6) and the subsequent processing are repeated. On the other hand, if the index "m" is greater than "3" (YES in S148 in FIG. 6), the processing under abnormal conditions is carried out (S150 in FIG. 6).

In the case where the connector lock is not completed within a predetermined period of time because the pin 127 gets stuck on the midway of the guide 227 for example (NO in S124 in FIG. 6), driving for connector unlock is carried out (S132 in FIG. 6). At this time, the rod rotating mechanism 136 rotates the rods 126 about the axis in the direction opposite from the direction at the time of driving for connector lock. The first connector 12 may also be driven backward to assist achievement of the connector unlock. Consequently, each rod 126 is gradually pulled out of the tube 226, while the pins 127 protruding from the sidewall of the rod 126 are each guided by the corresponding guide 227 of the tube 226, for achievement of the connector unlock. With achievement of the connector unlock, the first connector 12 is disconnected from the second connector 22. That is, the first charging terminals 122 and the first signal terminals 124 are disconnected from the second charging terminals 222 and the second signal terminals 224, respectively.

It is determined whether the connector unlock was achieved within a predetermined period of time, based on the rotation angle of the rod 126 by the rod rotating mechanism 136 (S134 in FIG. 6). If the determination result is positive, switching of the second sensor 112 from ON to OFF and other processing are carried out as in the case where it is determined that the first connector 12 failed to reach the intermediate position or the connection position within a predetermined period of time (see YES in S134, S140 and others in FIG. 6). If the determination result is negative, the processing under abnormal conditions is carried out (NO in S134, and S150 in FIG. 6).

After initiation of charging of the battery 20, in the charging apparatus 1, "second control processing" is carried out by the charge control unit 11. Specifically, an index "n" representing the number of times the first connector 12 is tried to be disconnected from the second connector 22 is reset to an initial value "0" (S202 in FIG. 7). It is further determined whether a charging completion signal indicating that the charging of the battery 20 is complete has been output from the control system 21 (S204 in FIG. 7). If the determination result is negative (NO in S204 in FIG. 7), it is then determined whether a charging termination command signal indicating that the robot 2 moves away from the charging apparatus 1 has been output from the control system 21 (S206 in FIG. 7). If it is determined that either the charging completion signal or the charging termination command signal has been issued (YES in S204 or YES in S206 in FIG. 7), supply of the current from the charging power source 10 to the battery 20 is stopped (S208 in FIG. 7).

Figure 7:
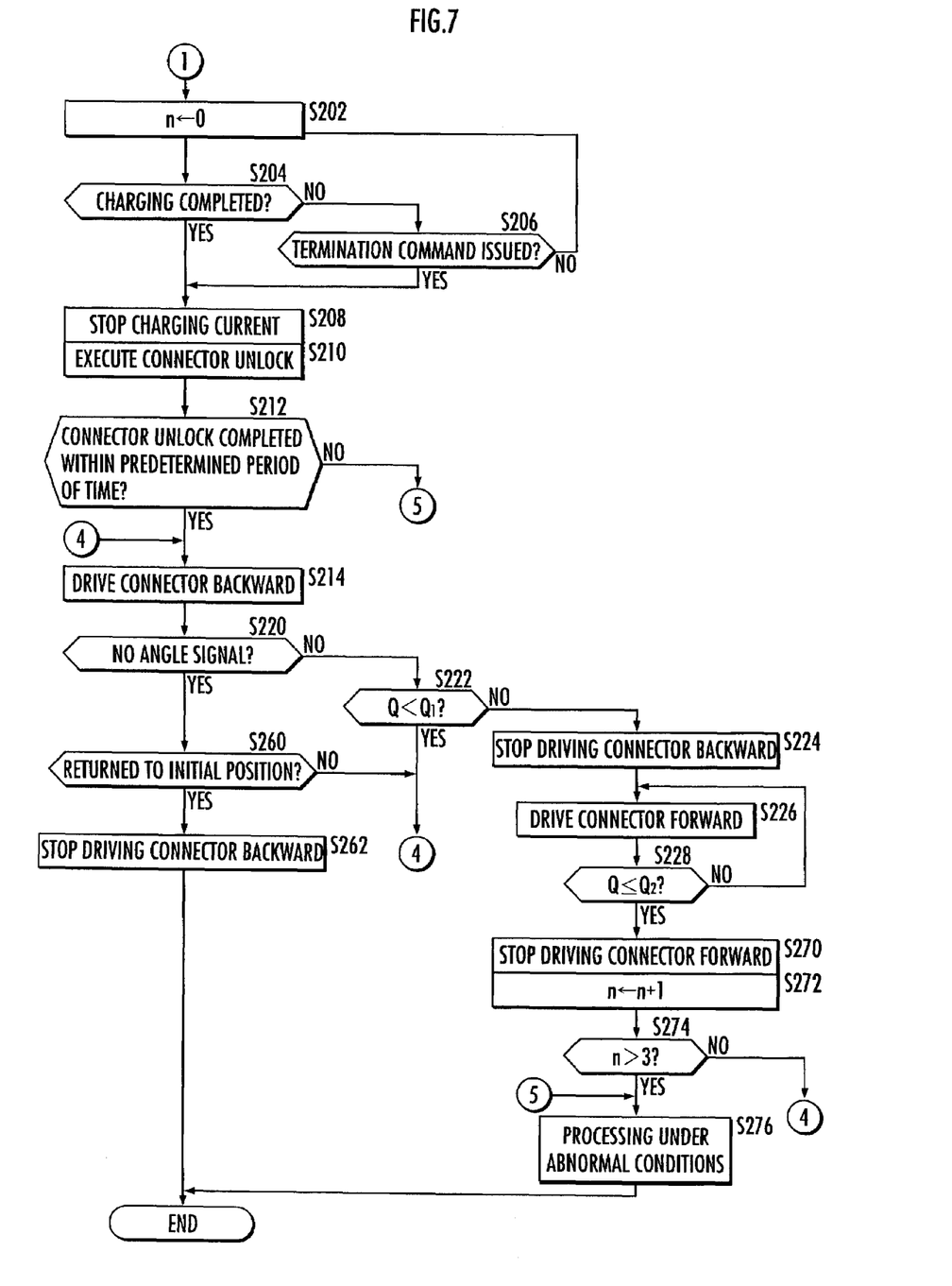
FIG. 7 illustrates second control processing according to the charging apparatus of the present invention.

Thereafter, driving for connector unlock is carried out (S210 in FIG. 7), and it is determined whether the connector unlock was completed within a predetermined period of time (S212 in FIG. 7). If it is determined that the connector unlock was completed within the predetermined period of time (YES in S212 in FIG. 7), the first connector 12 is driven backward by the connector driving mechanism 13 (S214 in FIG. 7).

Figure 9:
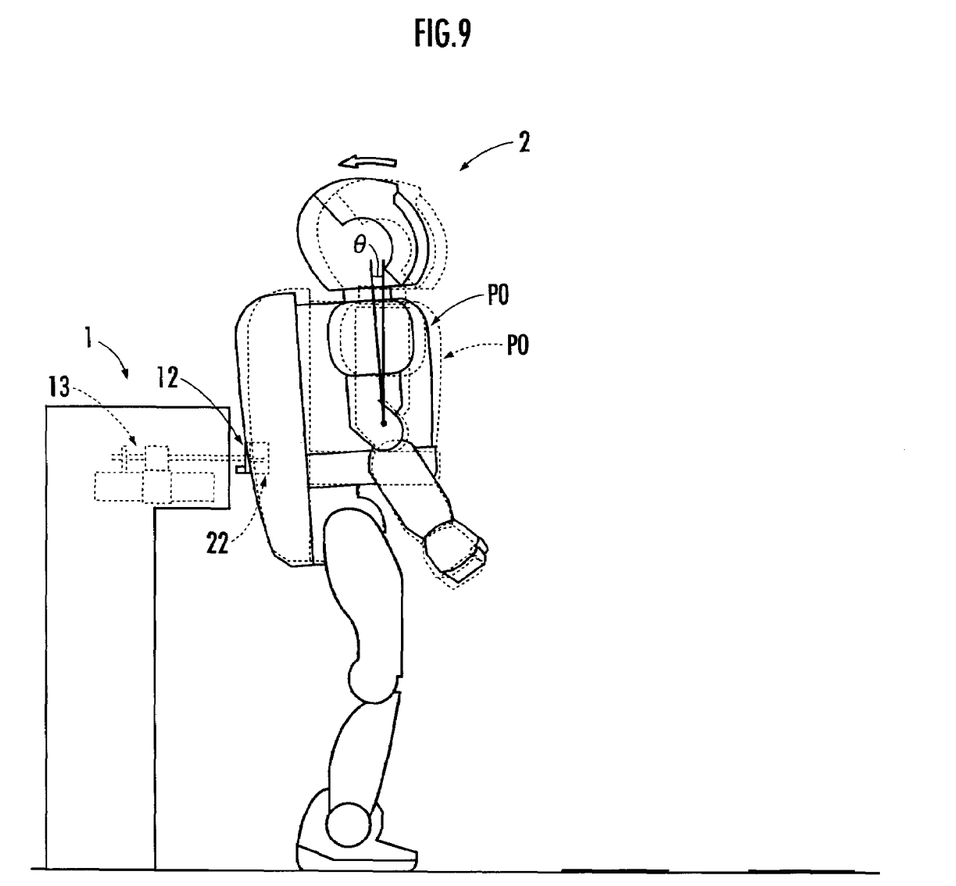
FIG. 9 shows, by way of example, states of the charging apparatus and the robot.

Further, it is determined whether an angle signal representing a tilt angle θ at which the body P0 of the robot 2 is tilted with respect to its vertical direction, as shown in FIG. 9, has been output from the tilt sensor 216 (S220 in FIG. 7). If it is determined that no angle signal has been issued (YES in S220 in FIG. 7), it is then determined whether the first connector 12 has returned to its initial position (S260 in FIG. 7). If the determination result is negative (NO in S260 in FIG. 7), the first connector 12 is driven backward continuously (S214 in FIG. 7). On the other hand, if the determination result is positive (YES in S260 in FIG. 7), the backward movement of the first connector 12 is stopped (S262 in FIG. 7). This completes a series of operations by the charging apparatus 1.

If it is determined that an angle signal has been issued (NO in S220 in FIG. 7), it is determined whether the tilt angle θ represented by the angle signal is less than a first predetermined angle θ1 (S222 in FIG. 7). If it is determined that the tilt angle θ of the body P0 is less than the first predetermined angle θ1 (YES in S222 in FIG. 7), the first connector 12 is driven backward continuously (S214 in FIG. 7). If it is determined that the tilt angle θ of the body P0 is not less than the first predetermined angle θ1 (NO in S222 in FIG. 7), the connector driving mechanism 13 stops driving the first connector 12 backward (S224 in FIG. 7), and drives it forward instead (S226 in FIG. 7).

Further, it is determined whether the tilt angle θ of the body P0 has become equal to or less than a second predetermined angle θ2 that is smaller than the first predetermined angle θ1 (S228 in FIG. 7). If it is determined that the tilt angle θ of the body P0 is greater than the second predetermined angle θ2 (NO in S228 in FIG. 7), the first connector 12 is continuously driven forward (S226 in FIG. 7). On the other hand, if it is determined that the tilt angle θ of the body P0 is equal to or smaller than the second predetermined angle θ2 (YES in S228 in FIG. 7), the connector driving mechanism 13 stops driving the first connector 12 forward (S270 in FIG. 7), and the index "n" is incremented by 1 (S272 in FIG. 7).

On the condition that the index "n" is not more than the threshold value "3" (NO in S274 in FIG. 7), the series of processing including driving of the first connector 12 backward again is repeated (see S214 and others in FIG. 7). On the other hand, if the index "n" has exceeded the threshold value "3" (YES in S274 in FIG. 7), the processing under abnormal conditions is carried out (S276 in FIG. 7). It is noted that the processing under abnormal conditions is carried out (S276 in FIG. 7) also in the case where the connector unlock is not completed within a predetermined period of time (NO in S212 in FIG. 7).

According to the charging apparatus 1 exerting the above-described functions, the first connector 12 is driven forward on the condition that it is confirmed that the position and posture of the robot 2 correspond to the predetermined position and the predetermined posture, respectively (see FIG. 5(c), and S106, S110, S112, S114, and S118 in FIG. 6). This means that, if the robot 2 attains the state where it stands still in the predetermined position and at the predetermined posture, the first connector 12 is driven forward, without forcing any further operation for a posture change or the like to the robot 2, thereby ensuring secure connection between the first connector 12 and the second connector 22.

Further, on the condition that the connected state is confirmed through communication of the charge control unit 11 with the control system 21 of the robot 2 via the first signal terminals 124 and the second signal terminals 224, the current output from the charging power source 10 is supplied to the battery 20 via the first charging terminals 122 and the second charging terminals 222 (see S124 and S130 in FIG. 6). This prevents the abnormal situation where the charge control unit 11 misunderstands that the battery 20 is being charged despite the fact that the first connector 12 is not connected with the second connector 22.

Furthermore, at the time of completion of charging of the battery 20 or the like, the first connector 12 is driven backward to ensure disconnection of the first connector 12 from the second connector 22 (see S214 and S262 in FIG. 7). The robot 2 is then capable of moving away from the charging apparatus 1 with the movements of the legs P3.

If the first connector 12 and the second connector 22 are still connected when the first connector 12 is driven backward, the body P0 of the robot 2 would be tilted, as shown in FIG. 9, as if being pulled backward by the first connector 12. However, it is possible to prevent the robot 2 from becoming unstable in posture by utilizing the fact that the connected state between the first signal terminals 124 and the second signal terminals 224 is maintained as the first connector 12 and the second connector 22 remain connected to each other. More specifically, in the case where the angle signal output from the tilt sensor 216 of the robot 2 is received by the charge control unit while the first connector 12 is being driven backward, the tilt angle θ of the body P0 represented by the angle signal can be recognized (see S220 and S222 in FIG. 7). That the angle signal can be received means that the connected state of the first connector 12 and the second connector 22 is maintained, and hence, it is highly likely that the posture of the robot 2 will become unstable if the first connector 12 is further driven backward (see FIG. 9). Accordingly, driving of the first connector 12 backward is stopped in response to the determination result that the tilt angle θ is not less than the first predetermined angle θ1 (see S222 and S224 in FIG. 7). This prevents the undesirable event that the posture of the robot 2, which is standing still, becomes unstable when the first connector 12 is disconnected from the second connector 22.

Further, the first connector 12 is driven forward after the backward movement thereof is stopped (see S224 and S226 in FIG. 7). Then, at the time when the tilt angle θ becomes equal to or smaller than the second predetermined angle θ2 that is smaller than the first predetermined angle θ1, the forward movement of the first connector 12 is stopped, and the first connector 12 is driven backward again (see S228, S270 and S214 in FIG. 7). In this manner, the posture of the robot 2 is made closer to the original posture at the time of initiation of the backward movement of the first connector 12 before it becomes unstable, and then, the first connector 12 is driven backward again. In other words, even if disconnection of the first connector 12 from the second connector 22 failed, it is tried again to disconnect the first connector 12 from the second connector 22, while maintaining stable posture of the robot 2.

If the number of times "n" the first connector 12 is tried to be disconnected from the second connector 22 exceeds the threshold value "3", further backward movement of the first connector 12 is stopped (S274 and S276 in FIG. 7). As such, in the abnormal situation where it is not possible to disconnect the first connector 12 from the second connector 22 by repeatedly driving the first connector 12 backward or the like, further backward driving of the first connector 12 is prohibited, which ensures motion economy of the charging apparatus 1.

Furthermore, the compliance mechanism 134 is provided which accommodates deflection of the cylinder rod 132 in the axial direction (see FIG. 3). This allows the first connector 12 to follow displacement of the second connector 22 due to the displacement of the body P0 of the robot 2 which takes place when the robot 2 moves the arm P2 or the like on the spot while the first connector 12 and the second connector 22 are connected to each other. Accordingly, it is possible to prevent the undesirable event that the movement of the robot 2 exerts excessive force on the first connector 12 and the second connector 22, which would otherwise cause damages to the connectors.

In the above-described embodiment, the backward movement of the first connector 12 is restricted based on the angle signal (see S220, S222 and S224 in FIG. 7). Alternatively, during the time when the first connector 12 is driven backward, the charge control unit 11 may routinely determine whether communication with the control system 21 is possible (the communication signal is not limited to the angle signal), and the backward movement of the first connector 12 may be restricted on the condition that it is determined that the communication is possible. In this manner, the undesirable event that the posture of the robot 2 becomes unstable can be prevented by utilizing the fact that the connected state between the first signal terminals 124 and the second signal terminals 224 is maintained as the first connector 12 and the second connector 22 remain connected to each other. In other words, in the situation where the charge control unit 11 is capable of communicating with the control system 21 via the first signal terminals 124 and the second signal terminals 224, the backward movement of the first connector 12 is restricted. This prevents the robot 2 from becoming unstable in posture due to unconditional driving of the first connector 12 backward.

Still alternatively, during the backward movement of the first connector 12, the charge control unit 11 may intermittently determine whether communication with the control system 21 is possible, and the backward movement of the first connector 12 may be restricted if it is determined that the communication is possible. For example, a part of the second control processing (see S220, S222, S224, S226, and S228 in FIG. 7) may be replaced with a corresponding part of the processing shown in FIG. 8. In the following explanation of the processing shown in FIG. 8, the description of the steps common to those in FIG. 7 will not be repeated.

Figure 8:
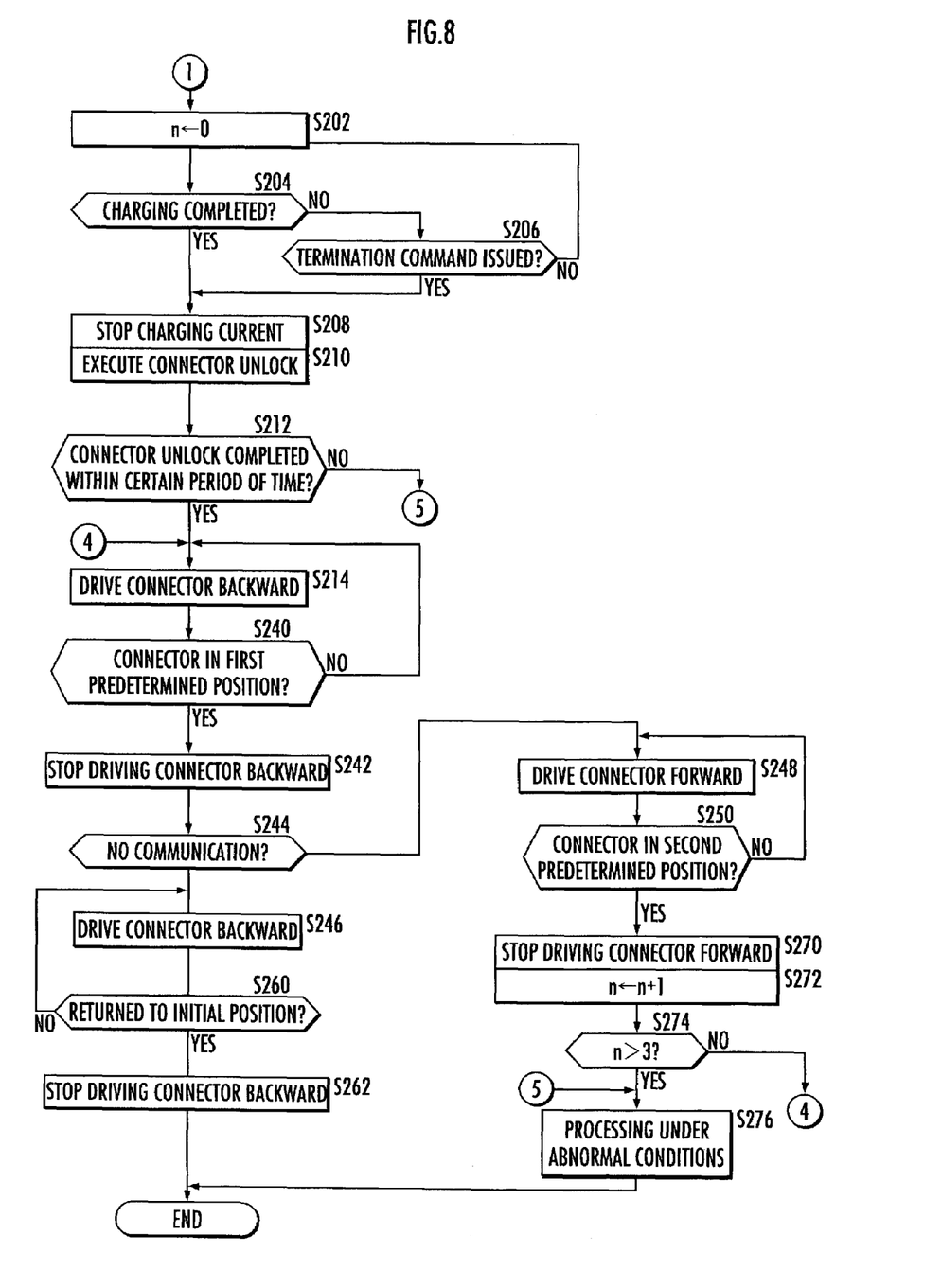
FIG. 8 also illustrates second control processing according to the charging apparatus of the present invention.

After completion of the connector unlock, the backward movement of the first connector 12 is stopped on the condition that the first connector 12 has reached a first predetermined position (YES in S240, and S242 in FIG. 8). At this time, it is determined whether communication with the control system 21 is possible (S244 in FIG. 8). If it is determined that the communication is impossible, the first connector 12 is driven backward again (YES in S244, and S246 in FIG. 8). On the other hand, if it is determined that the communication is possible, further backward movement of the first connector 12 is prohibited, and the first connector 12 is driven forward (NO in S244, and S248 in FIG. 8). On the condition that the first connector 12 has reached a second predetermined position, the forward movement of the first connector 12 is stopped, and the first connector 12 is driven backward again (YES in S250, S270, and S272 in FIG. 8).

According to the charging apparatus 1 having the above configuration, the charge control unit 11 determines whether communication with the control system 21 of the robot 2 is possible in the state where the first connector 12 is stopped at the first predetermined position after driven backward (see S244 in FIG. 8). That the communication is possible in this state means that the connected state of the first connector 12 and the second connector 22 is maintained, and hence, it is highly likely that the posture of the robot 2 may become unstable if the first connector 12 is further driven backward (see FIG. 9). Thus, further backward movement of the first connector 12 is prohibited in response to the determination result that the communication is possible. This prevents the undesirable event that the posture of the robot 2, which is standing still, becomes unstable when the first connector 12 is disconnected from the second connector 22.

Further, the first connector 12 is driven backward again after the posture of the robot 2 is made to be similar to the original posture at the time of initiation of the backward movement of the first connector 12, to prevent the posture of the robot 2 from becoming unstable (see S248, S250, S270, and S272 in FIG. 8). In other words, even if disconnection between the first connector 12 and the second connector 22 failed, it may be tried again to disconnect the first connector 12 from the second connector 22 while maintaining stable posture of the robot 2.

Further, it may also be configured such that the charge control unit 11 causes the connector driving mechanism 13 to stepwise or steplessly decrease the speed of driving the first connector 12 backward, with an increase in amount of backward movement of the first connector 12 by the connector driving mechanism 13. This allows the first connector 12 to be driven backward at a gradually decreased speed as the probability that the posture of the robot 2, which is standing still, may be unstable increases (see FIG. 9). This prevents the posture of the robot 2, which is standing still, from becoming unstable due to the event that, at the time when the first connector 12 is disconnected from the second connector 22 while the body P0 of the robot 2 is tilted with respect to the vertical direction, the robot 2 continues to move by inertia caused by the force applied to the body P0 from the first connector 12 to that time.

In the above-described embodiments, the first connector 12 is driven back and forth in the horizontal direction. In another embodiment, the first connector 12 may be driven back and forth in any direction in which the horizontal component of the force acts on the robot 2 during the backward driving thereof.

What is claimed is:

1. An apparatus for charging a battery mounted on a robot, the robot having a plurality of legs extended from its body and capable of being still or moving in a state of standing on the legs, with operations of the legs controlled by a control system,
the apparatus comprising a charging power source, a first connector, a connector driving mechanism which drives the first connector, and a charge control unit which controls an operation of the connector driving mechanism, the first connector having a first charging terminal and a first signal terminal, wherein
the body has a second connector connected to the first connector, the second connector having a second charging terminal and a second signal terminal, and the first and second charging terminals are connected and the first and second signal terminals are connected in a connected state of the first and second connectors, whereas the first and second charging terminals are disconnected and the first and second signal terminals are disconnected in a disconnected state of the first and second connectors, and wherein
the charge control unit causes the connector driving mechanism to drive the first connector forward to attain the connected state of the first and second connectors on the condition that the charge control unit confirms that the robot is standing still on the legs in a predetermined position and at a predetermined posture with the first and second connectors in the disconnected state,
the charge control unit allows the battery to be charged with a current output from the charging power source via the first and second charging terminals on the condition that the charge control unit confirms through communication with the control system via the first and second signal terminals that the first and second connectors are in the connected state, and
the charge control unit causes the connector driving mechanism to drive the first connector backward to allow the first and second connectors in the connected state to attain the disconnected state, and the charge control unit restricts an amount by which the first connector is driven backward on the condition that the charge control unit is capable of communicating with the control system via the first and second signal terminals during a time when the first connector is driven backward.

2. The charging apparatus according to claim 1, wherein at the time when the charge control unit causes the connector driving mechanism to drive the first connector backward, in the case where the charge control unit is capable of receiving via the first and second signal terminals an angle signal output from a tilt sensor provided in the robot and in a case where a tilt angle of the body with respect to a vertical direction represented by the angle signal is not less than a first predetermined angle, the charge control unit causes the connector driving mechanism to stop driving the first connector backward.

3. The charging apparatus according to claim 2, wherein the charge control unit causes the connector driving mechanism to stop driving the first connector backward and to drive the first connector forward, and in a case where the tilt angle of the body with respect to the vertical direction represented by the angle signal becomes not more than a second predetermined angle that is smaller than the first predetermined angle, the charge control unit causes the connector driving mechanism to stop driving the first connector forward and to drive the first connector backward again.

4. The charging apparatus according to claim 3, wherein in a case where a number of times the connected state of the first and second connectors is tried to be changed to the disconnected state or an accumulated time exceeds a threshold value, the charge control unit causes the connector driving mechanism to stop driving the first connector further backward.

5. The charging apparatus according to claim 1, wherein the charge control unit causes the connector driving mechanism to drive the first connector backward and to stop the first connector in a first predetermined position, determines whether communication with the control system is possible, and, on a condition that the communication is possible, prohibits the connector driving mechanism from driving the first connector further backward.

6. The charging apparatus according to claim 5, wherein after prohibiting the connector driving mechanism from driving the first connector further backward, the charge control unit causes the connector driving mechanism to drive the first connector forward and to stop the first connector in a second predetermined position, and causes the connector driving mechanism to drive the first connector backward again.

7. The charging apparatus according to claim 6, wherein in the case where a number of times the connected state of the first and second connectors is tried to be changed to the disconnected state or an accumulated time exceeds a threshold value, the charge control unit causes the connector driving mechanism to stop driving the first connector further backward.

8. The charging apparatus according to claim 1, wherein with an increase of an amount by which the first connector is driven backward by the connector driving mechanism, the charge control unit causes the connector driving mechanism to stepwise or steplessly decrease a speed of driving the first connector backward.

9. The charging apparatus according to claim 1, wherein the first connector has a first engagement portion and the second connector has a second engagement portion, and the first and second engagement portions are engaged in the connected state of the first and second connectors, whereas the first and second engagement portions are disengaged in the disconnected state of the first and second connectors.

10. The charging apparatus according to claim 9, wherein the first engagement portion corresponds to a pin protruding in a radial direction from a sidewall of a rod provided in the first connector, the rod having a tip end located closer to the second connector than the first charging terminal and the first signal terminal in a state where the robot is in the predetermined position and at the predetermined posture, the rod being rotated about an axis by a rod rotating mechanism, the second engagement portion corresponds to a terminal end of a guide formed on a sidewall of a tube to and from which the rod is inserted and extracted in an axial direction, the guide being adapted to guide the pin in a circumferential direction of the tube as the rod is moved in the axial direction while being rotated about the axis to be inserted to or extracted from the tube, and the charge control unit causes the rod rotating mechanism to rotate the rod about the axis, and causes the connector driving mechanism to drive the first connector forward or backward such that the rod moves in the axial direction.

11. The charging apparatus according to claim 1, comprising a compliance mechanism which holds the first connector in a manner allowing the first connector to follow displacement of the second connector due to displacement of the body in the connected state of the first and second connectors.

* * * * *